(12) United States Patent
Kauffmann et al.

(10) Patent No.: US 10,854,381 B2
(45) Date of Patent: Dec. 1, 2020

(54) DEVICE AND METHOD FOR CONNECTING SHEET METAL PARTS TO FORM LAMINATION STACKS

(71) Applicant: voestalpine Automotive Components Deutschland GmbH, Dettingen an der Erms (DE)

(72) Inventors: Jochen Kauffmann, Ebersbach (DE); Jochen Lanksweirt, Heidenheim (DE); Heinrich Bursy, Erkenbrechtsweiler (DE)

(73) Assignee: voestalpine Automotive Components Dettingen GmbH & Co. KG, Dettingen an der Erms (DE)

( * ) Notice: Subject to any disclaimer, the term of this patent is extended or adjusted under 35 U.S.C. 154(b) by 291 days.

(21) Appl. No.: 15/766,808

(22) PCT Filed: Oct. 7, 2016

(86) PCT No.: PCT/EP2016/074087
§ 371 (c)(1),
(2) Date: Apr. 7, 2018

(87) PCT Pub. No.: WO2017/060483
PCT Pub. Date: Apr. 13, 2017

(65) Prior Publication Data
US 2019/0066916 A1    Feb. 28, 2019

(30) Foreign Application Priority Data
Oct. 7, 2015  (EP) .................................... 15188851

(51) Int. Cl.
*H01F 41/02* (2006.01)
*B21D 22/02* (2006.01)
(Continued)

(52) U.S. Cl.
CPC ......... *H01F 41/0233* (2013.01); *B21D 22/02* (2013.01); *B32B 27/00* (2013.01);
(Continued)

(58) Field of Classification Search
CPC .... H01F 3/02; H01F 41/0206; H01F 41/0233; H01F 41/024; H02K 15/02; B21D 28/02;
(Continued)

(56) References Cited

U.S. PATENT DOCUMENTS

2015/0314563 A1* 11/2015 Fluch ...................... B32B 27/16
428/457

FOREIGN PATENT DOCUMENTS

EP    2450189 A1    5/2012
EP    2883692 A1    6/2015
(Continued)

OTHER PUBLICATIONS

Machine Translation of JPs 54-50919 translated using EPO website (Espacenet.com) retrieved from co-pending U.S. Appl. No. 16/345,691 (Year: 1979).*

*Primary Examiner* — Peter Dungba Vo
*Assistant Examiner* — Joshua D Anderson

(57) ABSTRACT

A device and a method for connecting sheet metal parts to form lamination stacks are demonstrated, in which sheet metal parts are stamped out of an electrical steel strip by means of at least one stamping stage, which has a die and a cutting edge that cooperates with the die, and the stamped-out sheet metal parts are stacked and at least integrally joined to form a plurality of lamination stacks; at least between a first sheet metal part of the stacked sheet metal parts and the subsequent second sheet metal part of the stacked sheet metal parts, a separating element is provided in order to facilitate the separation of the integrally joined sheet metal parts in lamination stacks. In order to improve
(Continued)

the reproducibility of the method, when applying the separating element, it is proposed that after the first sheet metal part is stamped out and before the second sheet metal part is stamped out, the separating element which, in accordance with the die geometry, is smaller or of the same size is conveyed to the die, is inserted into said die, and is thus provided to the first sheet metal part.

15 Claims, 3 Drawing Sheets

(51) Int. Cl.
*H01F 3/02* (2006.01)
*H02K 15/02* (2006.01)
*B32B 27/00* (2006.01)
*C21D 8/12* (2006.01)
*B32B 37/26* (2006.01)
*B21D 43/22* (2006.01)

(52) U.S. Cl.
CPC .............. *H01F 3/02* (2013.01); *H02K 15/02* (2013.01); *B21D 43/22* (2013.01); *B32B 2037/268* (2013.01); *C21D 8/12* (2013.01); *C21D 2261/00* (2013.01); *Y10T 29/49012* (2015.01); *Y10T 29/49078* (2015.01)

(58) Field of Classification Search
CPC ........ B21D 28/10; B21D 28/22; B21D 43/02; B21D 43/20; B21D 43/22; B21D 43/287; B21D 45/006; B32B 7/12; B32B 15/08; B32B 37/18; B32B 38/004; Y10T 29/49009; Y10T 29/49012; Y10T 29/09078; Y10T 29/5313
See application file for complete search history.

(56) References Cited

FOREIGN PATENT DOCUMENTS

| | | |
|---|---|---|
| JP | S5450919 A | 4/1979 |
| WO | 2014089593 A1 | 6/2014 |

* cited by examiner

DEVICE AND METHOD FOR CONNECTING SHEET METAL PARTS TO FORM LAMINATION STACKS

FIELD OF THE INVENTION

The invention relates to a device and method for connecting sheet metal parts to form lamination stacks in which sheet metal parts are stamped out of an electrical steel strip with at least one stamping stage, which has a die and a cutting edge that cooperates with the die, and the stamped-out sheet metal parts are stacked and at least integrally joined to form a plurality of lamination stacks; a separating element is provided at least between a first sheet metal part of the stacked sheet metal parts and the subsequent second sheet metal part of the stacked sheet metal parts in order to facilitate the separation of the integrally joined sheet metal parts in lamination stacks.

BACKGROUND OF THE INVENTION

In order to be able to separate sheet metal parts in lamination stacks, which sheet metal parts are pre-glued in a stamping and packeting process or are even glued at the end, it is known from the prior art (WO2014/089593A1), to provide a separating element between two stacked sheet metal parts in a stacking unit, which is embodied as a packet brake and is part of a progressive stamping tool. This is carried out in that before the progressive stamping tool, a separating film is provided in the form of a flat separating element that is laminated onto some areas of the electrical steel strip—which separating element on the stamped-out sheet metal part serves as a separating aid between lamination stacks that adjoin one another in the stacking unit. The application of the separating element disadvantageously requires an exact positioning with regard to the sheet metal part, which is to be separated and which, as the end or beginning of a lamination stack, marks the division of the lamination stacks in the packet brake. This method is therefore comparatively laborious from a process standpoint. Among other things, it requires various control and/or regulating loops in order, for example, to be able to compensate for deviations in the advancing motion of the electrical steel strip—which is a requirement for achieving dimensionally accurate lamination stacks.

SUMMARY OF THE INVENTION

The object of the invention, therefore, is to improve a method of the type explained at the beginning in such a way that the application of a separating element is easy to manage and can take place in a particularly reproducible way.

The invention attains the stated object with regard to the method in that after the first sheet metal part is stamped out and before the second sheet metal part is stamped out, the separating element—which, in accordance with the die geometry, is smaller or of the same size—is conveyed to the die, is inserted into said die, and is thus provided to the first sheet metal part.

If, after the first sheet metal part is stamped out and before the second sheet metal part is stamped out, the separating element—which, in accordance with the die geometry, is smaller or of the same size—is conveyed to the die, is inserted into said die, and is thus provided to the first sheet metal part, it is possible to create a solution that is particularly simple from a process standpoint and is particularly reproducible for applying a separating element between two sheet metal parts. Specifically, after a predetermined stack height is achieved, a separating element can be reliably applied to the lamination stack on its upper sheet metal part before the lower sheet metal part of an adjacent lamination stack is stamped out from the electrical steel strip. In addition, by means of this change in the application of the separating element between the last stamping step for the sheet metal part of the one lamination stack and the first stamping step for the sheet metal part of the other adjacent lamination stack, the method can be decoupled from possibly existing tolerances in the packeting process or stamping and packeting process—for example as part of the advancing of the sheet metal, which, with respect to the invention, is of particularly high relevance when the method step of the mounting of a separating element occurs earlier. In this way, it is therefore possible to assure an extremely reliable and exact separation of the lamination stacks. Lamination stacks, in particular lamination stacks composed of electrical steel, that are produced in this way are thus particularly well-suited for electric machines and for electric or electromagnetic applications.

In general, it should be noted that the separating element can, for example, be a flat shim composed of plastic or another material. A grid-like separating element is also conceivable in order to be able to fulfill the function of the separating element as an inlay between the sheet metal parts so as to facilitate separating the integrally joined sheet metal parts in lamination stacks. In general, it is also noted that the electrical steel strip is a semifinished product made of steel, for example embodied in the form of cold-rolled, non-grain-oriented electrical steel in the finally annealed state (DIN EN10106) or as grain-oriented electrical steel in the finally annealed state (DIN EN10107).

If the electrical steel strip is lifted up from the stamping die and after this, the separating element is conveyed under the raised electrical steel strip to the die, then it is comparatively easy and reliably possible to guide or insert the separating element into the die, which can contribute to facilitating the operation of the method.

The method can be further simplified if the separating element is dropped into the die. In this way, it is also possible to reliably avoid the risk of damage to the die caused by guide elements and thus as a further consequence, to increase the stability of the method.

Above all, the separating element can be prevented from tilting as it is inserted into the die if the separating element that has been inserted into the die has a lateral play relative to it. It is thus possible to simplify the operation of the method. In addition, the separating element that is smaller in comparison to the die opening can reduce the risk of damage to the inner wall of the die caused by the outer edges of the separating element. But this can also protect the lamination stacks, which are exiting from the die, from scoring marks—and also from other undesirable damage that can be transmitted from the die to the sheet metal parts. It is thus possible to further increase the reproducibility of the method according to the invention.

If, before the stamping, the electrical steel strip is coated at least in some areas with a hardenable, polymer adhesive layer, then in the stamping, it is possible to simply achieve a sufficient pressing of the sheet metal parts and thus a reproducible connection or pre-connection of the sheet metal parts into lamination stacks.

If the sheet metal parts are progressively stamped out from the electrical steel strip, then the method can enable production of lamination stacks that are particularly inexpensive to manufacture.

The method step of the lifting of the sheet metal strip up from the die can be facilitated if the feed directions of the separating element being conveyed to the die and of the electrical steel strip in the stamping stage extend in a horizontally inclined fashion relative to each other. Particularly if the two feed directions extend normal to each other, the strip section to be lifted can be kept small on the whole and thus the risk of damage to the sheet metal strip by the stamping stage or stages of the stamping tool can be reduced. The steps of the method according to the invention for inserting a separating element therefore have an advantageous effect on the reproducibility of the method.

In order to be able to remove the separating element from the respective lamination stack in a simple way, the separating element can be provided with a non-stick coating on at least one of its broad sides. This non-stick coating can, for example, be embodied as a silicone or Teflon coating.

Another stated object of the invention is to modify the design of a device for connecting sheet metal parts to form a lamination stack in such a way that the connected sheet metal parts can be reliably separated at the predetermined location in lamination stacks in order to ensure the production of particularly exact lamination stacks. In addition, the device should be embodied with a simple design.

The invention attains the stated object with regard to the device in that the feeder unit has a conveyor that can be moved toward and away from the die and that has a holding means for the separating element, which conveyor is embodied to introduce the separating element into the die.

If the feeder unit has a conveyor that can be moved toward and away from the die and that has a holding means for the separating element, which conveyor is embodied to introduce the separating element into the die, then this can yield a simply designed solution with which a separating element can be reliably provided on the first sheet metal part. The device according to the invention can therefore not only reproducibly provide exact lamination stacks, but can also be embodied with a particularly simple design.

If the feeder unit has a lifting unit for lifting the electrical steel strip up from the die, then not only does this provide reliable access to the die, it is also possible to minimize the risk of damage to the electrical steel strip during insertion of the separating element if the conveyor is embodied to move under the raised electrical steel strip, toward and away from the die.

The design of the device can be further simplified if the conveyor has a slider that can move, particularly in a linear fashion, which is equipped with the holding means. In addition, the slider can thus minimize the required spacing distance between the die and the sheet metal strip, which can further reduce the risk of damage to the electrical steel strip, for example in the stamping stage.

The separating element can be reliably held on the slider if the holding means is composed of a receptacle on the slider that can be placed onto the separating element in a form-fitting way.

If the feed directions of the electrical steel strip and the conveyor to the die extend in a horizontally inclined, in particular normal, fashion relative to each other, it is possible to further reduce the design complexity required to achieve a separate guidance of the electrical steel strip and endless strip.

The durability of the device according to the invention can be increased if the feeder unit has a dispenser with a plurality of separating elements, which is connected to the conveyor for the removal of separating elements.

The separating element can be prevented from tilting on the die if the die has at least one separating element and this separating element is inserted into the die and has a lateral play relative to the die. It is thus possible to further increase the ruggedness of the device.

BRIEF DESCRIPTION OF THE DRAWINGS

The figures show the subject of the invention by way of example based on one embodiment variant. In the drawings.

DETAILED DESCRIPTION OF THE PREFERRED EMBODIMENTS

Figure 1:
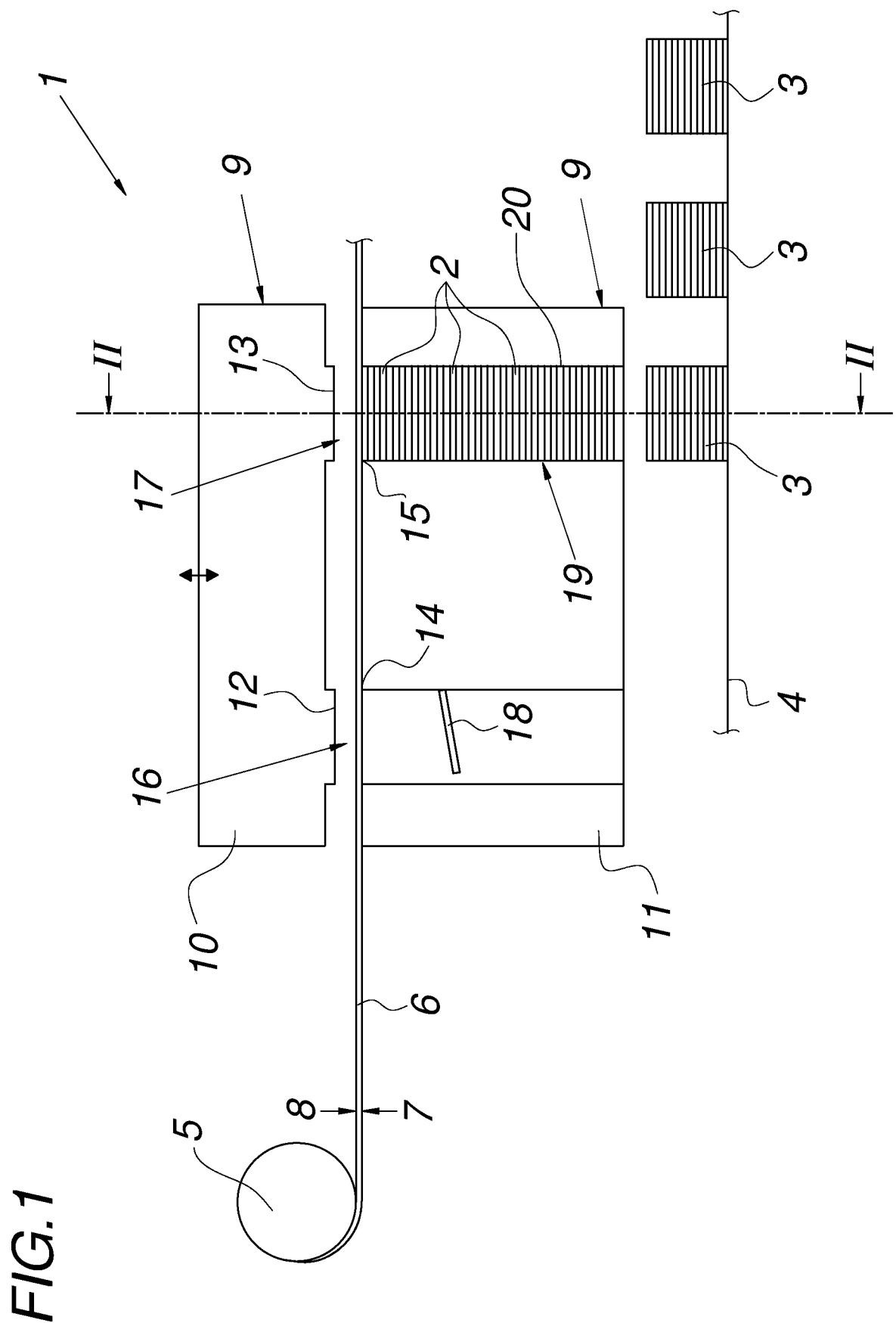
FIG. 1 shows a schematic view of a device for sheet metal packeting according to a packeting process.

FIG. 1 schematically depicts an exemplary embodiment of a device 1 for carrying out the method or packeting process, in particular the stamping and packeting process, according to the invention. This device 1 is used for packeting stamped-out sheet metal parts 2 to form lamination stacks 3, which, according to FIG. 1, are transported away from the device 1 with the aid of a conveyor belt 4.

For the method, an electrical steel strip 6—which is entirely covered on both strip sides 7, 8 by a polymer adhesive layer, namely a heat-cured baked-on varnish—is unwound from the coil 5. With the aid of a stamping tool 9, which is embodied in the form of a progressive stamping tool, a plurality of sheet metal parts 2 are stamped out from this varnish-coated electrical steel strip 6. Such a stamping process—generally speaking—can be a cutting-out, cutting-off, notching, cutting to length, division by squeezing, etc.

As can also be inferred from FIG. 1, the stamping tool 9 executes a cutting procedure with several strokes in that its upper tool 10 cooperates with its lower tool 11. The electrical steel strip 6 is preprocessed for a stamping procedure with a first cutting edge 12 of the upper tool 10, after which the sheet metal part 2 is stamped out from the electrical steel strip 6 and thus detached with a second cutting edge 13 of the upper tool 10. To accomplish this, the cutting edges 12, 13 cooperate with the respective dies 14, 15 of the lower tool 11, thus forming two stamping stages 16, 17 on the stamping tool 9.

The progressive cutting of the stamping tool 9 can be seen in FIG. 1 for example in that during the preprocessing, a part 18 is detached from the electrical steel strip 6. Then, the sheet metal parts 2 are stamped out with the aid of the stamping stage 17, are pushed by the upper tool 10 into a stacking unit 19, and are stacked therein. In a simply designed way, this stacking unit 19 situated after the die 15 is composed of a guide 20 in the lower tool 11, which guide 20 is also tapered in some regions in order to fulfill the function of a packet brake acting on the sheet metal parts 2 in the stacking unit 19 and in order to exert a compressive load against the upper tool 10. It is thus possible for the sheet metal parts 2 to assume a permanent, physical and/or chemical integral connection with the aid of the polymer adhesive layer that is present between the sheet metal parts 2.

In general, it should be noted that the stacking unit 19 can also be actively heated in order to improve the integral joining of the sheet metal parts 2. Furthermore, the lamination stacks 3 can be subjected to additional hardening steps that are not shown in detail in order to strengthen the integral joining between the sheet metal parts 2. Also not shown in detail is the possibility of a rotation of the stacking unit 19—in order, for example, to form segmented lamination stacks 3 composed of layers with a plurality of sheet metal parts 2 situated next to one another and stacked on top of one another. In general, it should be noted that—likewise not shown—as an alternative to the tapering, it is also conceivable to provide a counterholder in the guide, which exerts an appropriate counterpressure for the integral joining of the sheet metal parts 2.

Figure 2:
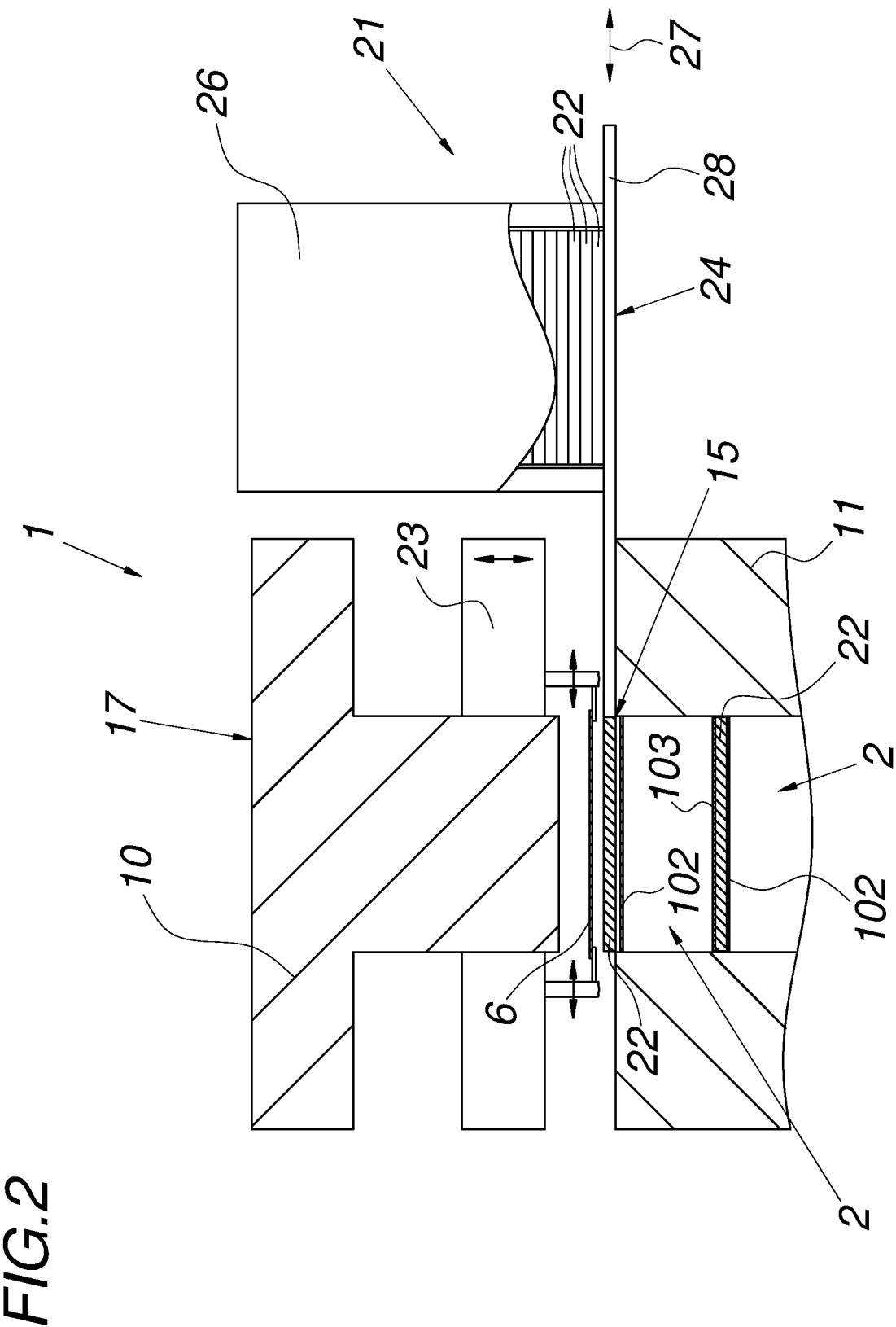
FIG. 2 shows a sectional view of FIG. 1 according to the line II-II.

In order to be able to more easily separate the lamination stacks 3 from one another as they exit the stacking unit 19, a flat separating element 22 is provided at least between two stacked sheet metal parts 2 by means of a feeder unit 21. This can be seen, for example, in FIG. 2, in that a flat separating element 22 such as a plastic shim is situated in the middle of the stacking unit 19 between a first sheet metal part 102 of the stacked sheet metal parts 2 and a subsequent second sheet metal part 103 of the stacked sheet metal parts 2.

The provision of the separating element 22 is enabled by the feeder unit 21 in that, as shown, a lifting unit 23 lifts the electrical steel strip 6 up from the die 15, thus providing access to the die 15 of the stamping stage 17. A conveyor 24 of the feeder unit 21, which is able to move under the raised electrical steel strip 6, toward and away from the die 15, uses this, by means of its holding means 25, to insert a separating element 22 into the stamping stage 17 or into the die 15 thereof. This is possible because the separating element, in its lateral dimensions, in accordance with the die geometry 115, is smaller or of the same size and thus can also be introduced into the die 15.

The conveyor 24 takes this separating element n from a dispenser 26 as needed. Consequently, a separating element 22 is reliably provided to the first sheet metal part 102 of the sheet metal parts 2 stacked in the stacking unit 19, which separating element 22, after a second sheet metal part 103 has been stamped out, is thus always reproducibly positioned at the desired separation point between the adjacent lamination stacks 3. Thus according to the invention, a reliable and reproducible separation of the stacked, integrally joined sheet metal parts 2 in precise lamination stacks 3 is achieved—in particular, even at the point at which the sheet metal parts 2 exit the stacking unit 19 and are furnished, for example, for further transport on a conveyor belt 4.

The conveyor 24 has a slider 28 that can move back and forth in a linear fashion along a feed direction 27 and that forms a semicircular recess 29 for the separating element 22 and in this regard, rests partially against separating element 22 in a form-fitting way. This ensures a reliable and easy-to-execute sliding of the separating element 22 from the dispenser 26 to the die 15.

If the separating element 22 that has been slid toward the die 15 is above the die 15, then it is released by the conveyor 24—in other words, the form-fitting, connection between the two is released—and as a result, the separating element is dropped into the die 15, thus preventing the conveyor from traveling into the die 15. Among other things, this avoids the risk of the conveyor 24 causing damage to the die 15. These advantages are improved further in that the dimensions of the separating element 22 are embodied in such a way that there is a lateral play 30 between the die 15 and the separating element 22 that has been inserted into it. As a result, it is possible to reliably prevent the separating element 22 from tilting as it is being inserted into the die 15, without negatively affecting the desired separation of the lamination stacks 3.

Figure 3:
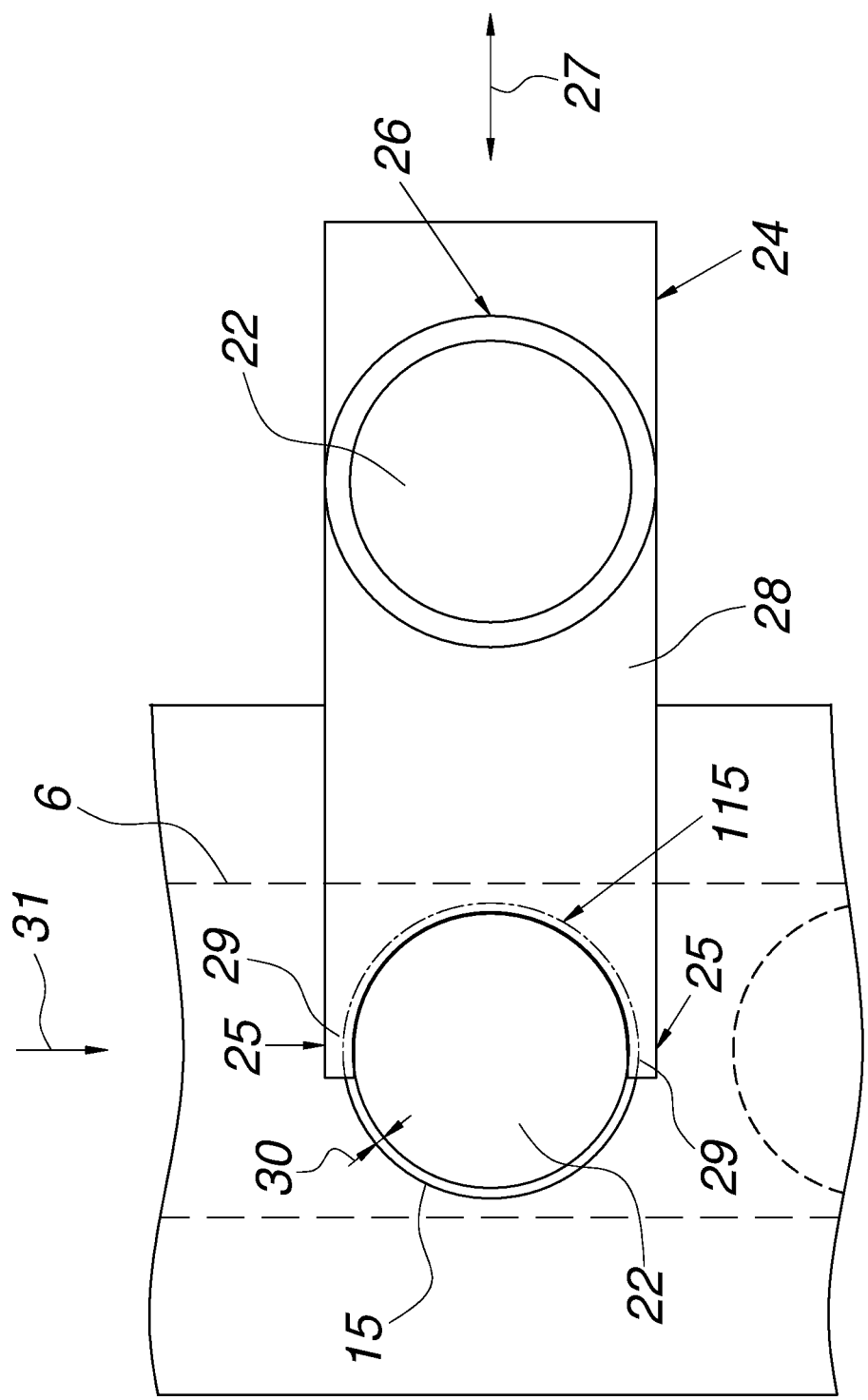
FIG. 3 shows a cut-away top view of the progressive stamping tool of the device according to FIG. 1, without its upper tool and the electrical steel strip.

It can also be inferred from FIG. 3 that the feed direction 27 of the conveyor 24 to and from the die 15 and the feed direction 31 of the electrical steel strip 6 extend in a horizontally inclined, normal fashion relative to each other. This facilitates the lateral placement of the feeder unit 21 in the stamping stage 17 and yields a compact device.

The invention claimed is:

1. A method for connecting sheet metal parts to form lamination stacks, the method comprising:
   stamping sheet metal parts out of an electrical steel strip using at least one stamping stage, which has a die and a cutting edge that cooperates with the die, wherein said die has a die geometry;
   stacking and at least integrally joining the stamped-out sheet metal parts to form a plurality of lamination stacks;
   providing a separating element at least between a first sheet metal part of the stacked sheet metal parts and a subsequent second sheet metal part of the stacked sheet metal parts, in order to facilitate separation of the integrally joined sheet metal parts in lamination stacks, wherein after the first sheet metal part is stamped out and before the second sheet metal part is stamped out, the separating element which, in accordance with the die geometry, is smaller or of the same size in comparison to the die geometry, is conveyed to the die and inserted into said die by a conveyor of a feeder unit, wherein the conveyor can be moved toward and away from the die and that has a holding means for the separating element, and is thus provided to the first sheet metal part.

2. The method according to claim 1, comprising lifting the electrical steel strip up from the die provided for the stamping and then conveying the separating element under the raised electrical steel strip to the die.

3. The method according to claim 1, comprising dropping the separating element into the die.

4. The method according to claim 1, wherein the separating element that is inserted into the die has a lateral play relative to the die.

5. The method according to claim 1, comprising progressively stamping the sheet metal parts out from the electrical steel strip.

6. The method according to claim 1, comprising coating the electrical steel strip at least in some areas with a hardenable, polymer adhesive layer before the stamping.

7. The method according to claim 1, wherein feed directions of the separating element that is conveyed to the die and of the electrical steel strip in the stamping stage extend in a horizontally inclined fashion relative to each other.

8. The method according to claim 1, wherein the separating element is provided with a non-stick coating on at least one of its broad sides.

9. A device for connecting sheet metal parts to form a lamination stack, the device comprising:
   a stamping tool that has at least one stamping stage, which has a die and a cutting edge that cooperates with the die in order to stamp out a sheet metal part from an electrical steel strip;

a stacking unit adjacent to the die that stacks and at least integrally joins the stamped-out sheet metal parts to form a plurality of lamination stacks; and a feeder unit that provides a separating element between a first of the sheet metal parts of the stacked sheet metal parts in the stacking unit and a subsequent second sheet metal part of the stacked sheet metal parts in the stacking unit, wherein the feeder unit has a conveyor that can be moved toward and away from the die and that has a holding means for the separating element, which conveyor is embodied to introduce the separating element into the die.

10. The device according to claim 9, wherein the feeder unit has a lifting unit that lifts the electrical steel strip up from the die and the conveyor is embodied to move under the raised electrical steel strip, toward and away from the die.

11. The device according to claim 9, wherein the conveyor has a slider, that can move in a linear fashion, which is equipped with the holding means.

12. The device according to claim 11, wherein the holding means is composed of a receptacle on the slider that can be placed onto the separating element in a form-fitting way.

13. The device according to claim 9, wherein feed directions of the electrical steel strip and the conveyor to the die extend in a horizontally inclined fashion relative to each other.

14. The device according to claim 9, wherein the feeder unit has a dispenser, which has a plurality of separating elements and is connected to the conveyor for the removal of separating elements.

15. The device according to claim 9, wherein the device has at least one separating element, which is inserted into the die and has a lateral play relative to the die.

* * * * *